United States Patent
Brough et al.

(10) Patent No.: US 6,850,964 B1
(45) Date of Patent: Feb. 1, 2005

(54) METHODS FOR INCREASING CACHE CAPACITY UTILIZING DELTA DATA

(75) Inventors: Farrell Lynn Brough, West Jordan, UT (US); Helaman David Pratt Ferguson, Orem, UT (US)

(73) Assignee: Novell, Inc., Provo, UT (US)

( * ) Notice: Subject to any disclaimer, the term of this patent is extended or adjusted under 35 U.S.C. 154(b) by 88 days.

(21) Appl. No.: 09/891,707

(22) Filed: Jun. 26, 2001

Related U.S. Application Data

(63) Continuation of application No. 09/748,552, filed on Dec. 26, 2000, now abandoned.

(51) Int. Cl.[7] .............................................. G06F 12/16
(52) U.S. Cl. ...................... 709/203; 707/203; 707/204; 711/118; 711/161; 711/162
(58) Field of Search .......................... 709/203; 707/203, 707/204; 711/118, 161, 162

(56) References Cited

U.S. PATENT DOCUMENTS

| | | | | |
|---|---|---|---|---|
| 5,734,898 A | * | 3/1998 | He ............................. | 707/203 |
| 5,832,520 A | * | 11/1998 | Miller ......................... | 707/203 |
| 6,038,647 A | | 3/2000 | Shimizu ...................... | 711/168 |
| 6,148,340 A | | 11/2000 | Bittinger et al. ............ | 709/224 |
| 6,401,239 B1 | * | 6/2002 | Miron ......................... | 707/203 |
| 2002/0065799 A1 | * | 5/2002 | West et al. .................... | 707/1 |

* cited by examiner

*Primary Examiner*—Reginald G. Bragdon

(57) ABSTRACT

Methods of increasing cache capacity are provided. A method of increasing cache capacity is provided wherein original data are received in a cache with access to one or more variants of the original data being required, but the variants do not reside in the cache. Access is provided to the variants by using one or more delta data operable to be applied against the original data to produce the variants. Moreover, a method of reducing cache storage requirements is provided wherein original data and variants of the original data are identified and located within the cache. Further, delta data are produced by noting one or more differences between the original data and the variants, with the variants being purged from the cache. Furthermore, a method of producing derivatives from an original data is provided wherein the original data and variants of the original data are identified. Delta data are produced by recording the difference between each variant and the original data, with the delta data and the original data being retained in the cache.

11 Claims, 4 Drawing Sheets

METHODS FOR INCREASING CACHE CAPACITY UTILIZING DELTA DATA

This application is a continuation and claims priority from U.S. application Ser. No. 09/748,552 filed on Dec. 26, 2000, now abandoned, the disclosure of which is incorporated herein by reference.

FIELD OF THE INVENTION

The present invention relates to methods for increasing cache capacity.

BACKGROUND OF THE INVENTION

Providing data and application services to large number of concurrent clients via a server poses a number of performance and memory challenges for the server. Some of these performance and memory challenges are alleviated by utilizing relatively small amounts of volatile memory called cache. By storing small frequently accessed or recently accessed data in the cache, clients may quickly use the data in connection with an application, since access to the data are in portions of the random access memory associated with the server and are correspondingly more efficiently retrieved by the server.

If the capacity of the cache could be improved, then the server would be capable of servicing more clients, addressing the needs of high data volume clients, and more efficiently assisting process intensive client requests. Moreover, the capacity of the cache is often constrained by the hardware architecture and the operating system architecture of the server. However, modifying the hardware and operating system associated with the server is not a practical option for most data and application service providers. This is so, because the hardware and operating system are circumscribed in large part by the state of existing technology available. Therefore, as a practical matter individual software applications must be developed to improve cache capacity and performance by logically expanding the cache capacity.

Presently, with the advent of the omnipresent Internet and browser technology utilized in connection with the World Wide Web (WWW), an increasing number of clients are making demands on servers, which provide data and application services. Moreover, these servers are expected to handle thousands of concurrent requests by clients without any significant degradation in response time to these clients Furthermore, users associated with some clients, which are utilizing the servers, are demanding much higher performance from data and application service providers. Broadband and high speed Internet connections have made the performance expectations of users extremely high, which has correspondingly placed difficult and unrealistic burdens on data and application service providers to become more efficient and more performance oriented.

Some data and application service providers have attempted to alleviate the growth pains associated with these increase demands by adding additional hardware to support the server services being provided. Yet, additional hardware entails additional maintenance and additional support which is becoming increasingly difficult to manage for the data and application service providers. More staff is required to support the additional hardware, and more software installed on the additional hardware ensures more expense associated with keeping everything in synch. Furthermore, as previously presented there reaches a point of diminishing returns at which time, the additional hardware added to the server does not increase performance but, rather, decreases performance.

Finally, as computing technology permeates all aspects of society and business, some businesses, which have never had to deal with computing technology and are correspondingly ill equipt to manage that technology, are turning to data and application service providers to outsource their technology needs. This demand to outsource business computing technology has added a new layer of demand and complexity on data and application service providers, since business clients of the server demand reliable, instant, and accurate service.

Accordingly, methods which will increase cache performance are needed so that data and application services being provided to clients utilizing server technologies may support increase demands in a more efficient manner without the need to add additional hardware. Although as one skilled in the art will appreciate, cache performance of an individual computing device which is not servicing multiple clients would benefit by increased cache performance as well.

SUMMARY OF THE INVENTION

Accordingly, an object of the invention is to provide methods of increasing cache capacity. By identifying data in a cache which is an original unmodified version of that data, and by identifying all the variant forms of the original data in the cache, the differences between the variant forms and the original form of the data may be determined, and the variant data may be discarded from the cache. Discarding the variant data from the cache will free up a substantial amount of space which the cache required to house the variant data.

Moreover, should a client request or need the variant data, the differences between the variant data and the original data may be applied against the original data to reconstruct the variant data on an as needed basis. This will remove large amounts of unused variant data from the cache and make it available only when needed, and increase cache capacity and performance substantially.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods for increasing cache capacity are provided.

A method for increasing cache capacity having executable instructions is provided, comprising receiving in a cache an original data wherein access is required to one or more variants of the original data, and the variants do not reside in the cache. Furthermore, access to one or more of the variants from the cache is provided by using one or more delta data which are operable to be applied against the original data to produce the variants of the original data. The delta data reside in the cache.

Further, a method of reducing cache storage requirements having executable instructions is provided, comprising identifying an original data in the cache and locating one or more variants of the original data in the cache. Next, one or more delta data are produced by noting one or more differences between the original data and the variants. After the delta data are produced, the variants are purged from the cache.

Moreover, a method of producing derivatives from an original data having executable instructions is provided, comprising identifying an original data residing in a cache and identifying one or more variants of the original data. Further, one or more delta data are produced by recording the difference between each variant and the original data. The original data and the delta data are retained in the cache.

Still other aspects of the present invention will become apparent to those skilled in the art from the following description of an exemplary embodiment, which is by way of illustration, one of the exemplary modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

The present invention provides methods for increasing cache capacity. One embodiment of the present invention is implemented in NOVELL's NetWare operating system environment providing concurrent web data and application services to clients via a web server and implemented with the Active Server Pages (ASP), Java, C, and C++ programming languages. Of course other operating systems, computing architectures, and programming languages (now known or hereafter developed) may also readily employed.

Further, another embodiment of the present invention augments existing software caching applications, such as applications developed specifically to assist in caching, for example NOVELL's Internet Caching System (ICS). ICS is an application which sits between a client and a server used by the client, and it facilitates caching for the client in connection with the server. Of course other caching applications (now known or hereafter developed) may also benefit from the present invention as well.

Data which reside in a cache may be used for a variety of purpose, for example and by way of example only, data may be viewed by a requester not having the ability to modify the data, data may be modified by a requestor, and the like. Moreover, a requestor may be an application residing on a computing device associated with the cache, an application residing remotely from the computing device associated with the cache, and the like.

As previously presented, access to data residing in cache is critical to the performance of an application requiring the data, and the more capacity that the cache has to retain data, the better performance an application will experience since access to data required by the application may be readily retrieved from the random access memory of the computing device having the data.

Moreover, in a multi-computing environment, such as by way of example only, a client-server based architecture, multiple clients may rely on a server to provide data or application services. It is also readily apparent to one skilled in the art that a single server may also be a client, and that a server may actually entail multiple computing devices. Furthermore, a single client may be associated with a user, an application, and the like. At the lowest level, accesses to a cache associated with a computing device occurs by software applications. Further, these applications are accessing the cache to retrieve references to data needed by the applications to perform some function or operation of the application.

Figure 5:
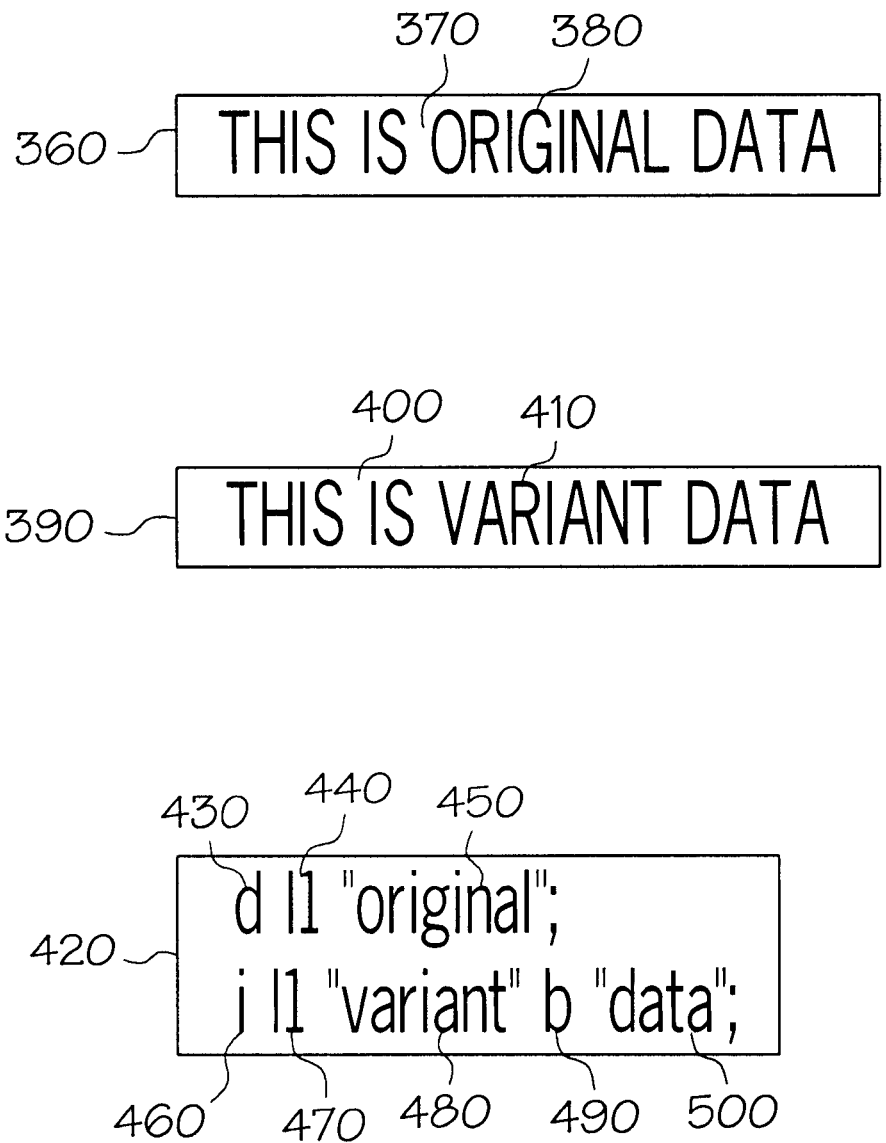
FIG. 5 depicts a schematic diagram of original data, variant data, and delta data.

With this context, being used for purposes of illustration only, consider FIG. 5 which depicts a schematic of original data 360, variant data 390, and delta data 420. These data may at different points in time reside in the cache associated with a computing device. Original data 360 refers to data which is unaltered, or a first version of data beginning with some initial point in time which may or may not become altered at some later point in time. If alterations occur to the original data 360, each instance of these alterations may be viewed as variant data 390, which are altered original data 360, or a subsequent version of the original data 360.

The original data 360 in FIG. 5 comprises a string of textual characters 370. Although, text characters are used for illustrative purposes in FIG. 5, it will be readily apparent to those skilled in the art that any computer readable medium data will suffice as data for purposes of the present invention, and that any computer readable medium data are capable of residing in the cache of a computing device. Variant data 390 are a derivative of the original data 360, having a single substring "variant" 410 in the variant data 390 which replaces the substring "original" 380 occurring in the original data 360.

Moreover, the differences between the original data 360 and the variant data 390 may be reflected by a delta data 420 which is operable to be read by a set of executable instructions on a computing device and applied against the original data 360 to produce the variant data 390. In this way, the delta data 420, may be retained in the cache of a computing device together with the original data 360, and the variant data may be discarded or purged freeing up significant space within the cache and thereby increasing cache capacity. Furthermore, the efficiency of accessing the cache is improved since variant data 390 are not stored in the cache.

Consider delta data 420, which depict a single example of how executable instructions may be embodied in the delta data 420, such that when these instructions are executed using the original data 360, variant data 390 is produced. In the present example, the single character "d" 430 is an indication that a delete operation is to take place on the first line "11" 440 of the original data 360. Further, the substring "original" 450 is what is to be deleted from the original data. The character "i" 460 in the delta data 420 is an indication that an insert operation is also to be performed on the original data 360 in order to generate the variant data 390. The insertion is to occur on line 1 "11" 470 with the substring "variant" 480 to be inserted before "b" 490 the substring "data" 500 which occurs in the original data 360. After executing these instructions comprising the delta data 420, the variant data 390 is produced, since all unaltered aspects of the original data 360 carry over to the generated variant data 390. In this way, variant data 390 may be recreated as needed by applying one or more delta data 420 against the original data 360.

As one skilled in the art will appreciate, the exact form of the delta data 420 may take on a variety of syntaxes without departing from the present invention, just like computing programming languages do. The syntax of the delta data 420 is presented by way of example only to demonstrate how executable instructions defining the differences between original data 360 and variant data 420 may be assembled so that when applied against the original data 360 the variant data 390 is reproduced. Moreover, delta data may include any instructions which are operable to be applied against an original data and produce a variant data.

In this way, delta data may include, by way of example only, user specific extensible stylesheets language (XSL) files which are operable to be applied against original data (e.g. extensible markup language (XML) files) to produced individualized variant data. As one skilled in the art will readily appreciate, any data which may be interpreted or applied against an original data to produce variant data may be considered delta data.

Further, the construction of the original delta data 420 may be achieved with any number of readily available software applications which compare two data files and produce a report as to the differences. The report itself may be used as the delta data 420, with a customized application written to read the report and apply it against the original data 360 to produce the variant data 390.

For example, and by way of example only, the UNIX operating system provides an operation entitled "diff" which produces a report as to the differences between two data files. This well known UNIX command also provides an option "e" where the report produced is in a script format which may be directly executed using the original data as input to produce a variant data. As one skilled in the art will readily appreciate, producing delta data are easily achieved with a variety of existing tools in the art.

By way of example only, consider a client-server based architecture in which the clients are web browsers remotely accessing the web server to acquire a specific web page housed on the server. Initially, the web page may not reside in the server's cache so the first request by a client for the web page causes the server to acquire the web page and place it in the cache. A profile of the client, or a security associated with the requested web page may require a variant version of the web page to be provided to the client, rather than the unaltered form of the web page. If this is the case, the original web page is altered and a variant web page is produced, placed in cache, and made available to the client.

After the variant page is created and placed in cache, it is noted that a variant web page now resides in the cache along with an original web page. An application may be applied to compare the original web page and the variant web page while in the cache, producing a delta data which are operable to be applied against the original web page to produce the variant web page. These delta data are stored in the server cache as well, and the variant web page is flushed out of the server cache, but the delta data remain.

Subsequently, the variant web page is again requested wherein it is determined that the variant web page does not reside in the cache, but the delta data and the original web page necessary to create the variant web page does. Therefore, the delta data and the original web page are used to create the variant web page as needed, while the variant web page need not reside in the server cache, thereby freeing up resources of the server cache to house other data needed to service additional clients and client requests.

In this way a web server, servicing a variety of concurrent clients and requests, may house a single original web page in its cache, along with one or more much smaller delta data operable to produce multiple variant web pages, wherein each variant web page may be quickly and efficiently generated from the original web page using the appropriate delta data which does reside in cache. This permits the web server to handle more requests and service more clients since the cache capacity is increased, because the delta data are much smaller compact data files then the complete variant data files.

Figure 1:
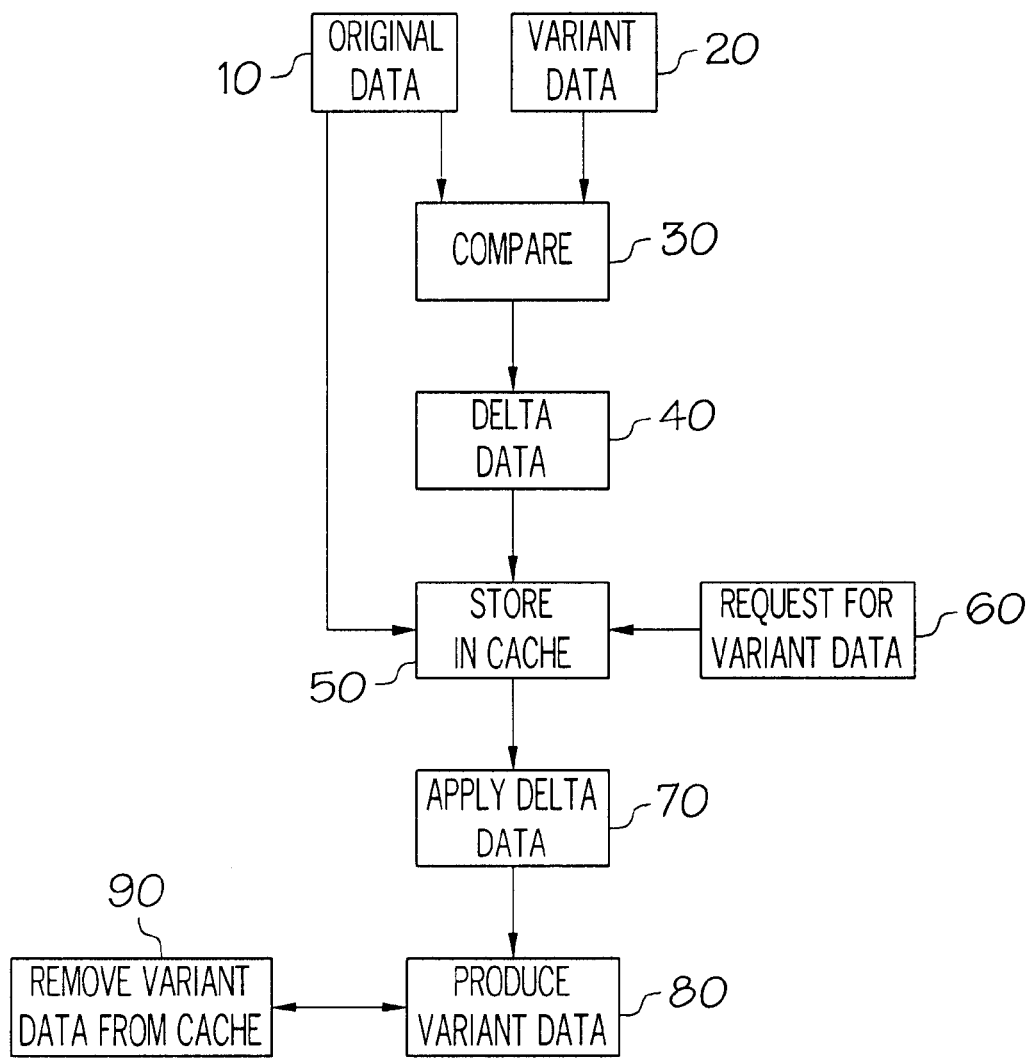
FIG. 1 depicts a flow diagram of a method of increasing the capacity of a cache.

FIG. 1 depicts a flow diagram of a method of increasing the capacity of a cache. Initially, original data are received in step 10, concurrently a request to modify the original data may occur wherein variant data are received in step 20. The original data and the variant data are then compared to one another in step 30. Comparison may occur using any number of readily available software utilities, such as by way of example only, the UNIX "diff" facility. The output of the compare in step 30, is the production of a delta data 40, which are operable to be applied against the original data to produce a variant data.

Once the delta data are created, the original data and the delta data are retained in the cache in step 50. The variant data may be removed from the cache if it was placed in the cache during the compare step 30 (not shown). Next, a request is received for variant data in step 60, wherein the delta data and the original data are acquired from the cache in step 50, and the delta data are applied against the original data in step 70, producing the requested variant data in step 80. The variant data are then sent to the requestor and are purged from the cache in step 90. As one skilled in the art will readily appreciate, management of a server cache using the method depicted in FIG. 1 permits a cache to flush itself of large amounts of data and retain only smaller more efficient delta data, this additional space will increase cache throughput and capacity.

Figure 2:
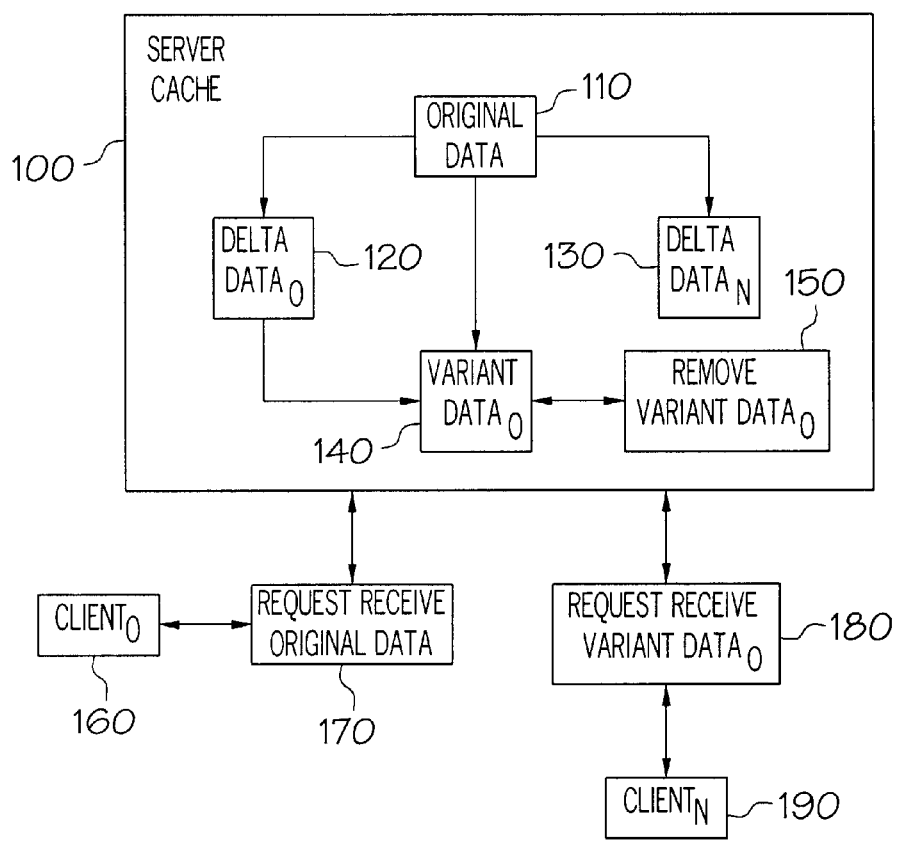
FIG. 2 depicts a schematic diagram of a method for increasing the cache capacity of a server.

Referring to FIG. 2, which depicts a schematic diagram of a method for increasing the cache capacity of a server. Considering, by way of example only, a server cache 100 wherein original data 110 resides and multiple delta data, such as delta data$_O$ 120 and delta data$_N$ 130. Client$_O$ 160 makes a request to receive original data 110 in request step 170, this request is sent to a server, wherein the server checks the server cache 100 and determines that the original data 1110 are present and provides the original data to the request in step 170.

Concurrently to the request by client$_O$ 160, a client$_N$ 190 makes a request of a server to receive variant date in step 180, this causes the server to check the server cache 100 wherein it is determined that delta data$_O$ 120 are present along with original data 110. The delta data$_O$ are then executed using the original data 110 to produce variant data$_O$ 140, which are immediately sent to client$_N$ 190 via step 180. Next, the variant data$_O$ 140 are removed from the server cache 100 in step 150.

Although FIG. 2 depicts a server cache 100, which is serving multiple clients, one skilled in the art will readily appreciate that the cache may reside on a stand alone computing device, and the clients may be applications residing on the stand alone computing device. In this way, management of the cache is improved in a single computing environment as well as in a multi-computing environment, such as by way of example only in a client-server based architecture.

Figure 3:
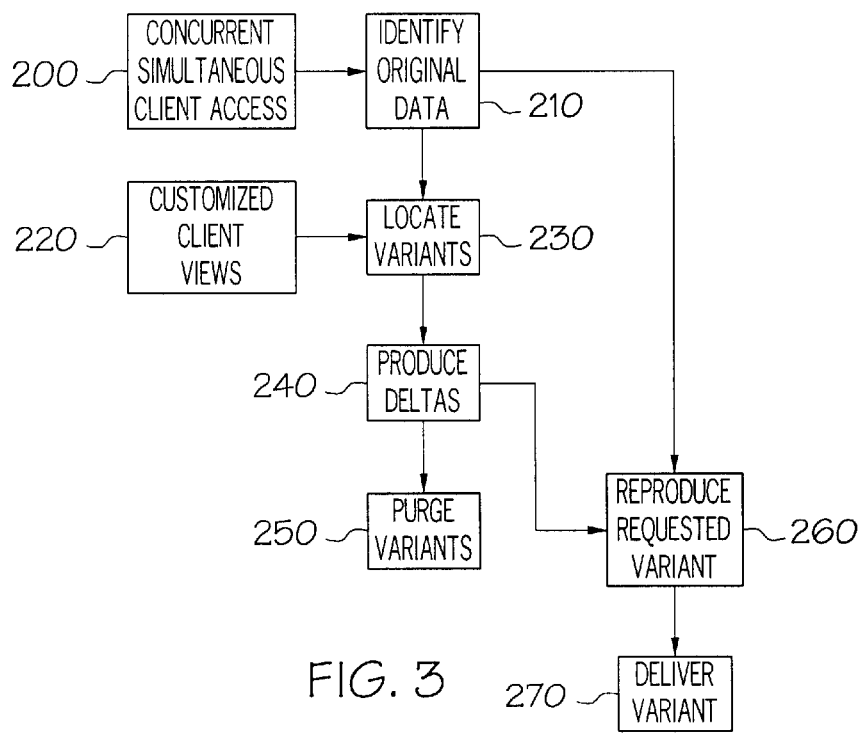
FIG. 3 depicts a flow diagram of a method of reducing cache storage requirements.

FIG. 3 depicts a flow diagram of a method of reducing cache storage requirements. By reducing the storage requirements of a cache, its throughput and performance may be improved as previously presented. Moreover, a cache may provide simultaneous access or concurrent access to clients or applications in step 200, wherein requests are being made to access original data or variants associated with original data.

In step 210, original data are identified. Identification of original data may occur in a variety of ways, such as by way of example only, applications which use a first data and produce a second data, detecting the production of the second data identifies the first data as original data. For example, a web page which is modified by a personal profile to produce a customized web page. Further, ad hoc software utilities may be written to periodically scan the cache for data which appear similar. As one skilled in the art will appreciate, there are a variety of ways to identify original data residing in the cache.

Once the original data are identified in the cache in step 210, the variants are located in step 230. As previously presented, these variants may be, by way of example only, customized client views, or security restricted views of original data as depicted in step 220. Next, delta data are produced in step 240 using the identified original data and the located variant data. Once delta data exist in the cache to reproduce the variant data, the variant data may be purged in step 250. Upon a request in step 260, variant data are reproduced by applying the delta data to the original data, and in step 270 the variant data are delivered to the requester.

Figure 4:
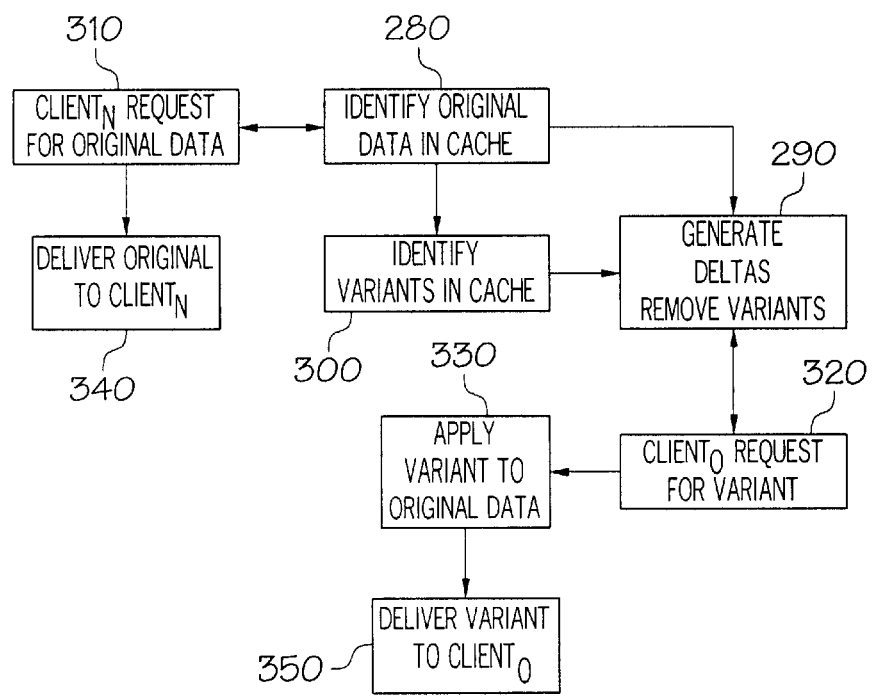
FIG. 4 depicts a flow diagram of a method of producing derivatives from an original data.

FIG. 4 depicts a flow diagram of a method of producing derivatives from an original data. Initially, in step 280 original data are identified in a cache. Next, variant data associated with the original data are identified in step 300. Further, the variant data are compared to the original data to generate a delta data in step 290. The delta data reflect differences between the original data and the variant data, and are operable to be executed and applied against the original data to produce variant data associated with a version of the original data. Moreover, the variant data may be removed from the cache, in step 290, once the delta data has been generated.

Multiple clients may access the cache in parallel, concurrently, or simultaneously, such as $client_N$ in step 310 where $client_N$ is requesting access to the original unaltered data residing in the cache, which are delivered to $client_N$ in step 340. Moreover, $client_O$ requests a variant form of the original data in step 320, wherein the delta data and original data are acquired and applied in step 330 to generate and deliver the variant form of the original data to $client_O$ in step 350.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed:

1. A method for increasing cache capacity utilizing executable instructions, the method comprising:
   receiving in a cache of a first computer an original data;
   receiving in the cache of the first computer one or more variants of the original data;
   identifying the one or more variants of the original data as varying from the original data;
   after identifying the one or more variants, producing one or more delta data files in the cache of the first computer by noting differences between the original data and the one or more variants, wherein the delta data files are operable to be applied against the original data to produce the one or more variants of the original data;
   purging the one or more variants from the cache of the first computer, wherein access is required to the one or more variants of the original data after the one or more variants were purged from the cache;
   providing access to the one or more of the variants from the cache of the first computer by applying in the cache of the first computer the one or more delta data files against the original data to produce the one or more variants of the original data, wherein the one or more delta data files reside in the cache of the first computer, and wherein the access is provided by transmitting the one or more variants from the first computer to a client computer; and
   after the transmitting operation, purging the one or more variants from the cache of the first computer to increase the cache capacity of the first computer, and retaining the original data and the one or more delta data files in the cache of the first computer.

2. The method of claim 1, further comprising the steps of:
   providing concurrent access to the original data residing in the cache to one or more clients.

3. The method of claim 1, further comprising the steps of:
   receiving a request from a client for at least one of the one or more variants prior to providing access to the one or more variants.

4. The method of claim 1, wherein at least one of the one or more variants is a personalized variant customized for a client.

5. The method of claim 1, wherein each delta file is smaller in a byte size than its corresponding variant.

6. A method of reducing cache storage requirements utilizing executable instructions, the method comprising:
   identifying an original data in a cache of a server;
   identifying one or more variants of the original data in the cache of the server;
   producing one or more delta data in the server by noting one or more differences between the original data and the variants, wherein the one or more delta data is operable to be applied against the original data to produce the one or more variants of the original data; and
   purging the variants from the cache of the server;
   receiving a request from a client for the one or more variants;
   in response to the request, reproducing the one or more variants in the cache of the server by applying the delta data against the original data;

in response to the request, transmitting the one or more variants from the server to the client; and after the transmitting operation, purging the one or more variants from the cache of the server to increase the cache capacity of the server, and retaining the original data and the delta data in the server cache.

7. A method of producing derivatives from original data utilizing executable instructions, the method comprising:

identifying original data residing in a cache of a server;

identifying variant data of the original data in the cache of the server by automatically scanning the cache for similarities between the variant data and the original data;

producing delta data by recording the difference between the variant data and the original data in the cache of the server, wherein the delta data is operable to be applied against the original data to produce the variant data upon a request from a client for the variant data; and retaining in the cache of the server the original data and the delta data.

8. The method of claim 7, further comprising the steps of:

removing the variant data from the cache of the server.

9. The method of claim 8, further comprising the steps of:

reproducing the variant data by applying the delta data against the original data.

10. The method of claim 9, further comprising the steps of:

delivering the variant data when requested by one or more clients.

11. The method of claim 7, further comprising the steps of:

providing parallel access to the original data and the delta data to one or more clients.

* * * * *